US010987806B2

(12) United States Patent
Sakai

(10) Patent No.: US 10,987,806 B2
(45) Date of Patent: Apr. 27, 2021

(54) PRODUCTION METHOD AND PRODUCTION SYSTEM THAT USE ROBOT

(71) Applicant: FANUC CORPORATION, Yamanashi (JP)

(72) Inventor: Tamotsu Sakai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 196 days.

(21) Appl. No.: 16/362,387

(22) Filed: Mar. 22, 2019

(65) Prior Publication Data

US 2019/0299408 A1    Oct. 3, 2019

(30) Foreign Application Priority Data

Mar. 27, 2018    (JP) .............................. JP2018-060339

(51) Int. Cl.
    *B25J 9/16*    (2006.01)
(52) U.S. Cl.
    CPC .......... *B25J 9/1633* (2013.01); *B25J 9/1612* (2013.01); *B25J 9/1664* (2013.01)
(58) Field of Classification Search
    None
    See application file for complete search history.

(56) References Cited

U.S. PATENT DOCUMENTS

| 2009/0157226 A1* | 6/2009 | de Smet | G01B 11/002 |
| | | | 700/254 |
| 2012/0028545 A1* | 2/2012 | Duescher | B24B 49/12 |
| | | | 451/28 |
| 2015/0127141 A1* | 5/2015 | Kawada | B25J 13/085 |
| | | | 700/206 |
| 2016/0032540 A1 | 2/2016 | Reda | |

(Continued)

FOREIGN PATENT DOCUMENTS

| CN | 106335053 A | 1/2017 |
| CN | 206254004 U | 6/2017 |

(Continued)

OTHER PUBLICATIONS

Notice of Reasons for Refusal dated Apr. 21, 2020, for Japanese Patent Application No. 2018060339.

(Continued)

*Primary Examiner* — Robert T Nguyen
(74) *Attorney, Agent, or Firm* — Karceski IP Law, PLLC

(57)    ABSTRACT

According to a production method, when a workpiece is grasped with a hand that includes two grasping pieces that grasp the workpiece by sandwiching the workpiece in a width direction between two surfaces orthogonal to a subject flat surface, and pressing surfaces that abut against a to-be-pressed surface of the workpiece opposite to the subject flat surface, the pressing surfaces are caused to abut against the to-be-pressed surface near a grasping position. The robot is operated on a basis of forces detected by a force sensor so (Continued)

that the robot assumes an orientation with which moments about axes that lie within the subject flat surface are balanced, and the workpiece is grasped with the two grasping pieces of the hand at a position where the moments are balanced. The robot is then operated to assume an orientation with which the subject flat surface aligns with the target flat surface.

5 Claims, 9 Drawing Sheets

(56) References Cited

U.S. PATENT DOCUMENTS

| | | | |
|---|---|---|---|
| 2017/0008171 A1 | 1/2017 | Iwatake | |
| 2017/0057093 A1 | 3/2017 | Miyamoto | |
| 2021/0032033 A1* | 2/2021 | Kalouche | B65G 1/065 |

FOREIGN PATENT DOCUMENTS

| | | | |
|---|---|---|---|
| DE | 102015213326 A1 | 1/2017 | |
| EP | 3081352 A1 | 10/2016 | |
| JP | S609690 A | 1/1985 | |
| JP | S60217089 A | 10/1985 | |
| JP | H04111768 A | 4/1992 | |
| JP | H09225871 A | 9/1997 | |
| JP | H09262762 A | 10/1997 | |
| JP | 2002224938 A | 8/2002 | |
| JP | 2003133819 A | 5/2003 | |
| JP | 2006159368 A | 6/2006 | |
| JP | 2011041992 A | 3/2011 | |
| JP | 2013166202 A | 8/2013 | |
| JP | 2015112658 A | 6/2015 | |
| JP | 2017047479 A | 3/2017 | |

OTHER PUBLICATIONS

Search Report by Registered Search Organization dated Mar. 24, 2020, for Japanese Patent Application No. 2018060339.
Chinese Office Action dated Nov. 2, 2020, for Chinese Patent Application No. 201910211235.8.

* cited by examiner

PRODUCTION METHOD AND PRODUCTION SYSTEM THAT USE ROBOT

CROSS-REFERENCE TO RELATED APPLICATIONS

This application is based on and claims priority to Japanese Patent Application No. 2018-060339, filed on Mar. 27, 2018, the entire content of which is incorporated herein by reference.

FIELD OF THE INVENTION

The present invention relates to a production method and production system that use a robot.

BACKGROUND OF THE INVENTION

A system for processing workpieces having various surface shapes is known.

According to this processing system, a robot having a hand to which a tool is attached is controlled on the basis of a force signal detected by a force sensor installed in the hand so that the tool moves and tracks the surface shape of the workpiece (for example, see Japanese Unexamined Patent Application, Publication No. 2011-41992).

SUMMARY OF THE INVENTION

One aspect of the present invention is directed to a production method that includes: grasping a workpiece with a hand attached to an end of a robot equipped with a force sensor; and pressing a subject flat surface of the grasped workpiece against a target flat surface at an even pressure distribution. The hand includes two grasping pieces that grasp the workpiece by sandwiching the workpiece in a width direction between two surfaces orthogonal to the subject flat surface, and pressing surfaces that abut against a to-be-pressed surface of the workpiece opposite to the subject flat surface. When grasping the workpiece with the hand, the pressing surfaces are caused to abut against the to-be-pressed surface at a vicinity of a grasping position, the robot is operated on a basis of forces detected by the force sensor so that the robot assumes an orientation with which moments about axes that lie within the subject flat surface are balanced, and the workpiece is grasped with the two grasping pieces of the hand at a position where the moments are balanced. Then the robot is operated to assume an orientation with which the subject flat surface aligns with the target flat surface.

Another aspect of the present invention is directed to a production system that includes a robot equipped with a force sensor; a hand that grasps a workpiece, the hand being attached to an end of the robot; and a controller that controls the robot. The hand includes two grasping pieces that grasp the workpiece by sandwiching the workpiece in a width direction between two surfaces orthogonal to a subject flat surface of the workpiece, and pressing surfaces that abut against a to-be-pressed surface of the workpiece opposite to the subject flat surface. When grasping the workpiece with the hand, the controller controls the robot so that the pressing surfaces are caused to abut against the to-be-pressed surface at a vicinity of a grasping position, the robot is operated on a basis of forces detected by the force sensor so that the robot assumes an orientation with which moments about axes that lie within the subject flat surface are balanced, and the workpiece is grasped with the two grasping pieces of the hand at a position where the moments are balanced; and then the controller controls the robot so that the robot assumes an orientation with which the subject flat surface aligns with the target flat surface.

DESCRIPTION OF EMBODIMENT(S) OF THE INVENTION

A production method and a production system 1 that use a robot 2 according to one embodiment of the present invention will now be described with reference to the drawings.

The production method of this embodiment involves pressing a polishing surface (target flat surface) 6a of a polisher 6 against a to-be-polished surface (subject flat surface) W1 of a workpiece W grasped with a hand 4 so as to polish the to-be-polished surface W1 of the workpiece W.

Figure 1:
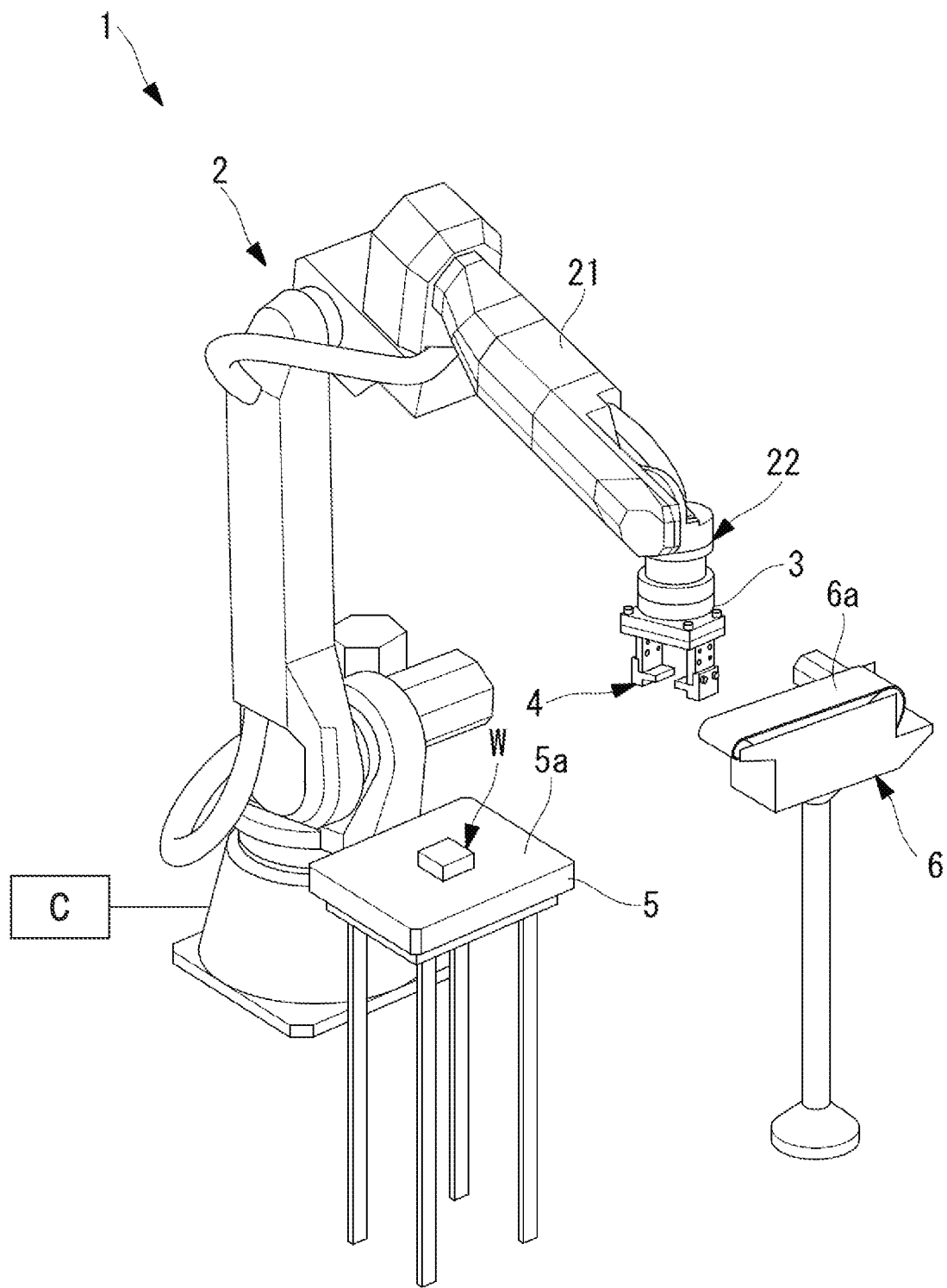
FIG. 1 is a diagram illustrating the overall structure of a production system according to one embodiment of the present invention.

As illustrated in FIG. 1, the production system 1 of this embodiment is equipped with the robot 2, a controller C that controls the robot 2, a force sensor 3 attached to the end of the robot 2, the hand 4 attached to the end of the robot 2 with the force sensor 3 therebetween, a table 5 on which the workpiece W is placed, and a belt sander (polisher) 6 that polishes the to-be-polished surface W1 of the workpiece W. In the example illustrated in FIG. 1, the robot 2 is a vertical articulated robot, and the force sensor 3 and the hand 4 are installed at the end of a wrist 22 at the end of an arm 21.

Figure 2:
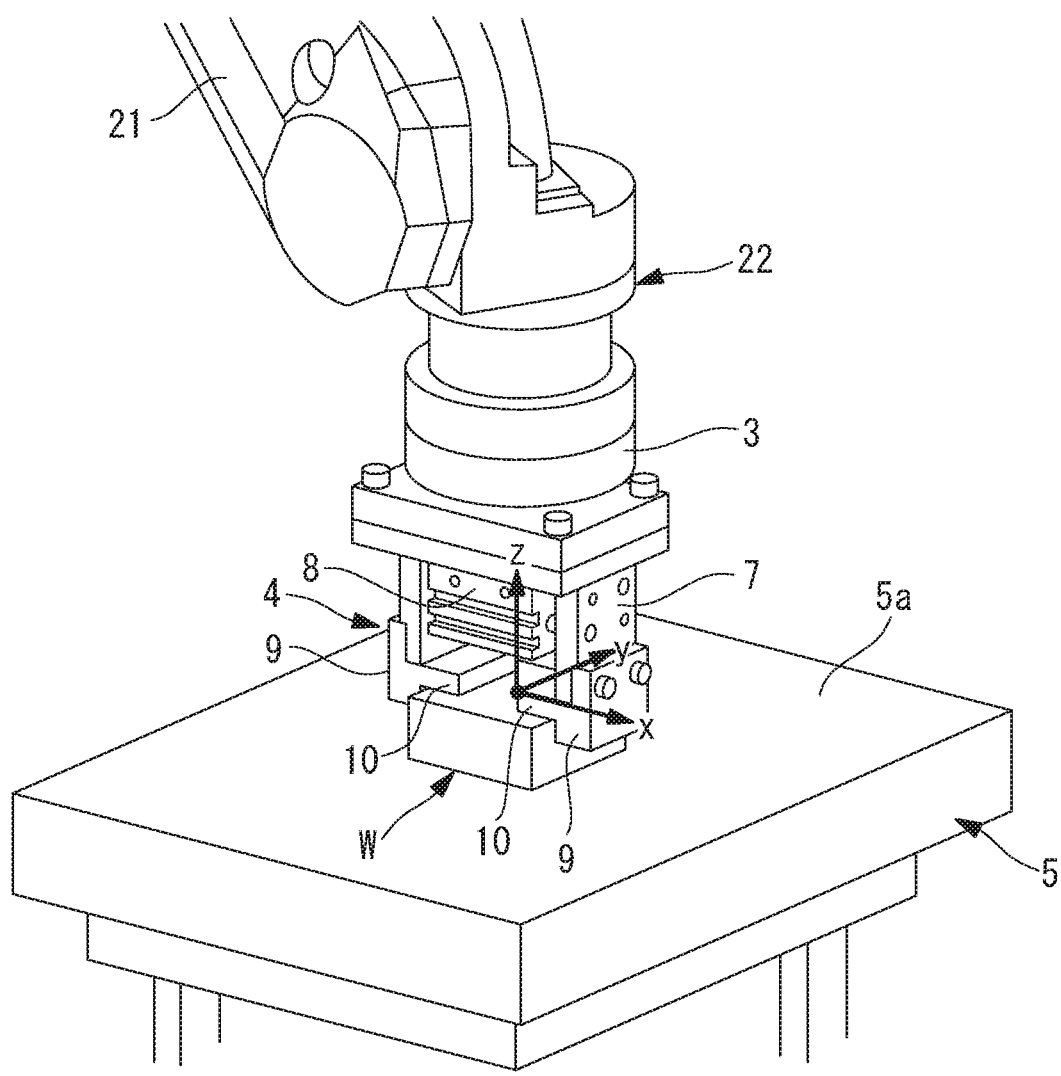
FIG. 2 is a partial perspective view illustrating a hand and a force sensor attached to a robot of the production system illustrated in FIG. 1.
Figure 6:
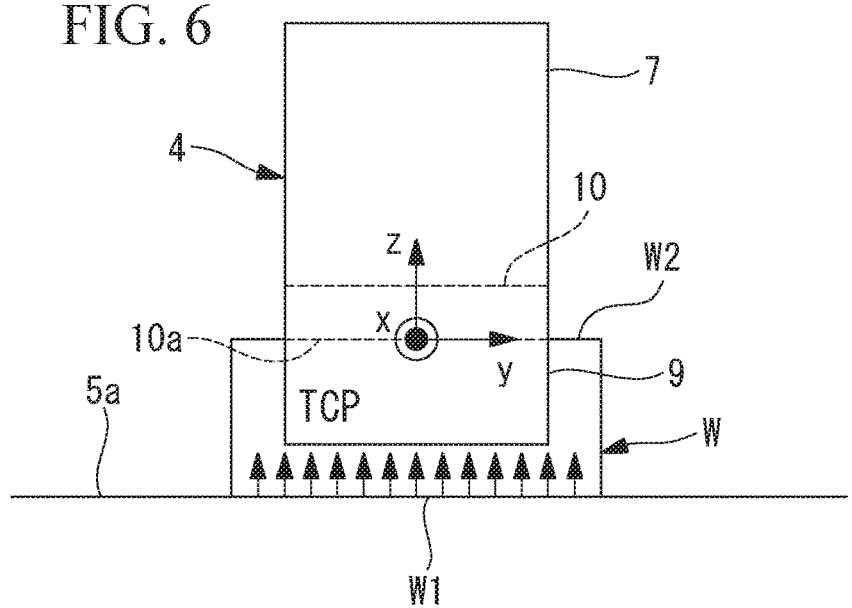
FIG. 6 is a schematic diagram illustrating a pressure distribution generated in a to-be-polished surface when the workpiece illustrated in FIG. 3 is grasped.

As illustrated in FIGS. 2 and 6, a tool center point (TCP) fixed with respect to the hand 4 is set in front of the wrist 22 of the robot 2, and the force sensor 3 detects forces in axis directions in the xyz coordinates set with respect to the TCP and the moments about the respective axes.

The hand 4 is equipped with two grasping pieces 9 that are supported by a bracket 7 fixed to the force sensor 3, and the two grasping pieces 9 can be closed and opened by operating a cylinder 8. Each of the grasping pieces 9 has a pressing surface member 10 having the form of a cantilevered beam. The pressing surface member 10 is at a position a particular distance away from the end of the grasping piece 9 toward the base, and extends parallel to the xy plane from the surface of the grasping piece 9 facing the other grasping piece 9.

Figure 3:
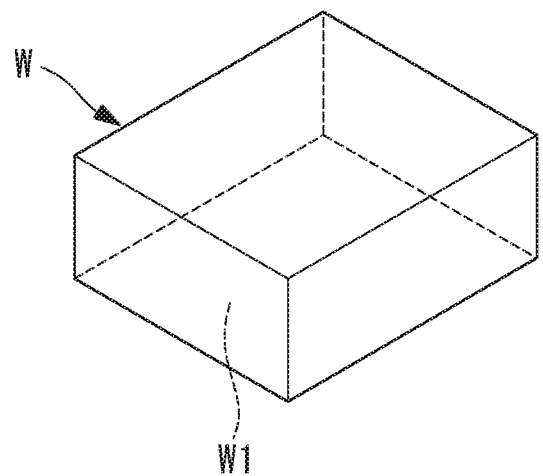
FIG. 3 is a perspective view illustrating a typical workpiece to be processed by the production system illustrated in FIG. 1.
Figure 5:
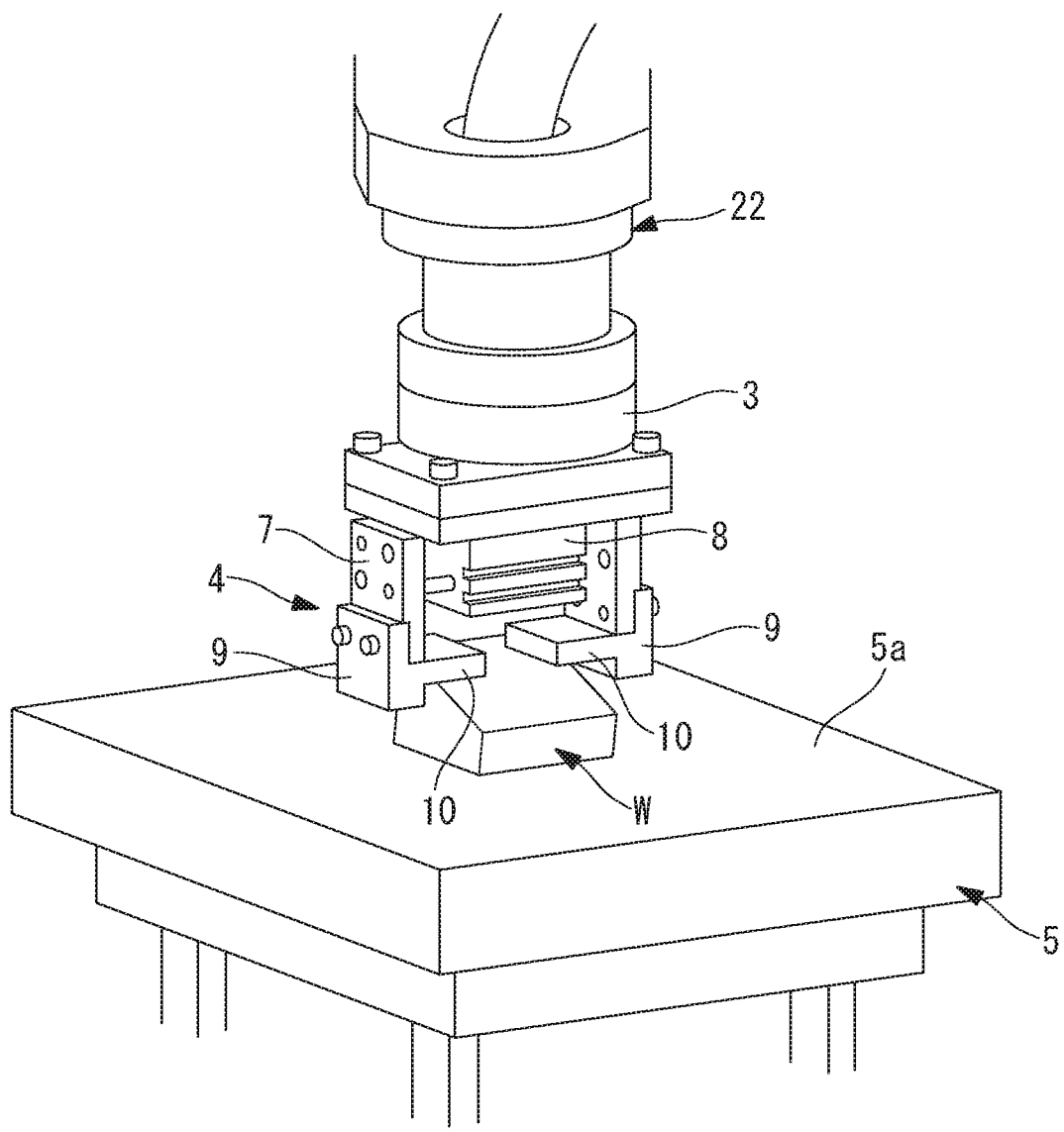
FIG. 5 is a partial perspective view illustrating a state in which the hand is placed near the grasping position of the workpiece illustrated in FIG. 4.

As illustrated in FIG. 3, it is anticipated that the workpiece W to be grasped with the hand 4 is a rectangular parallelepiped workpiece W. As illustrated in FIG. 5, in order to grasp such a workpiece W, the hand 4 is brought close from above to the workpiece W, which is placed with the to-be-polished surface W1 facing down on a table surface 5*a* of the table 5, and the two grasping pieces 9 set apart from each other by the cylinder 8 are positioned to flank the workpiece W in the x axis direction (width direction).

Then, as illustrated in FIG. 6, end-side surfaces (pressing surfaces) 10*a* of the pressing surface members 10 of the grasping pieces 9 are pressed against an upper surface (to-be-pressed surface) W2 of the workpiece W. In this state, the grasping pieces 9 are closed so that the workpiece W is sandwiched between the two grasping pieces 9 in the x axis direction and so that the workpiece W can be grasped by friction. The TCP is preferably disposed at the center position between the two grasping pieces 9 within a flat plane that includes the pressing surfaces 10*a*.

The to-be-polished surface W1 of the workpiece W grasped with the hand 4 as such is brought into close contact with a polishing surface 6*a* of the belt sander 6 so that an even pressure distribution is imparted to the to-be-polished surface W1 and the surface can be polished evenly.

The controller C operates the robot 2 according to a pre-taught operation program, and commands the robot 2 to perform the following operation in order to grasp the workpiece W placed on the table 5.

Figure 7:
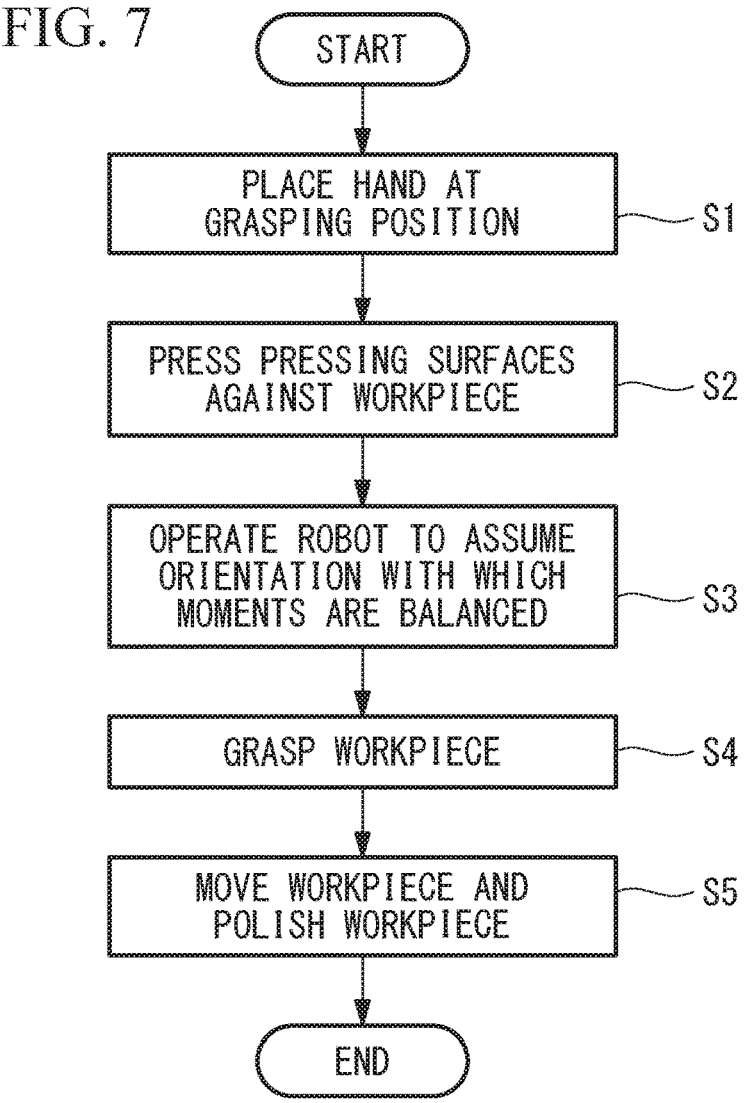
FIG. 7 is a flowchart illustrating one example of a production method that uses a robot according to one embodiment of the present invention.

As illustrated in FIG. 7, in the production method that uses the robot 2 of this embodiment, first, the robot 2 is operated to place the hand 4 at a position where the workpiece W is to be grasped (step S1). Specifically, the hand 4 is brought close to the workpiece W from vertically above the workpiece W, and the two grasping pieces 9 set apart from each other by the cylinder 8 are positioned to flank the workpiece W in the x axis direction.

Then, the hand 4 is moved vertically downward so as to press the pressing surfaces 10*a* of the pressing surface members 10 of the grasping pieces 9 against the upper surface W2 of the workpiece W (step S2). In this state, the robot 2 is operated to assume an orientation with which the moments about the x, y, and z axes detected by the force sensor 3 are balanced (step S3). As illustrated in FIG. 3, when the workpiece W has a precise rectangular parallelepiped shape, the moments about the axes are not generated, and an equilibrium is maintained.

Figure 4:
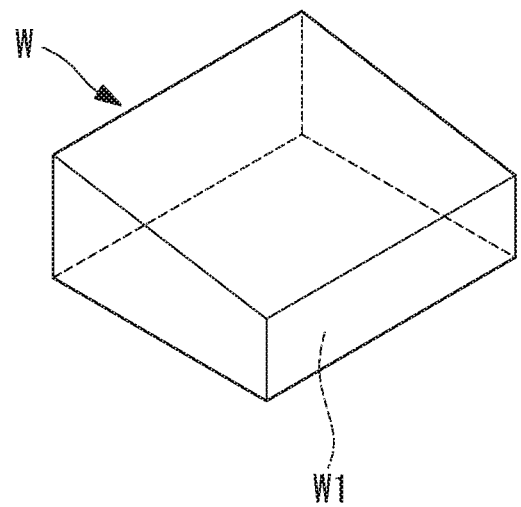
FIG. 4 is a perspective view illustrating a workpiece having a slanted upper surface compared to the workpiece illustrated in FIG. 3.
Figure 8:
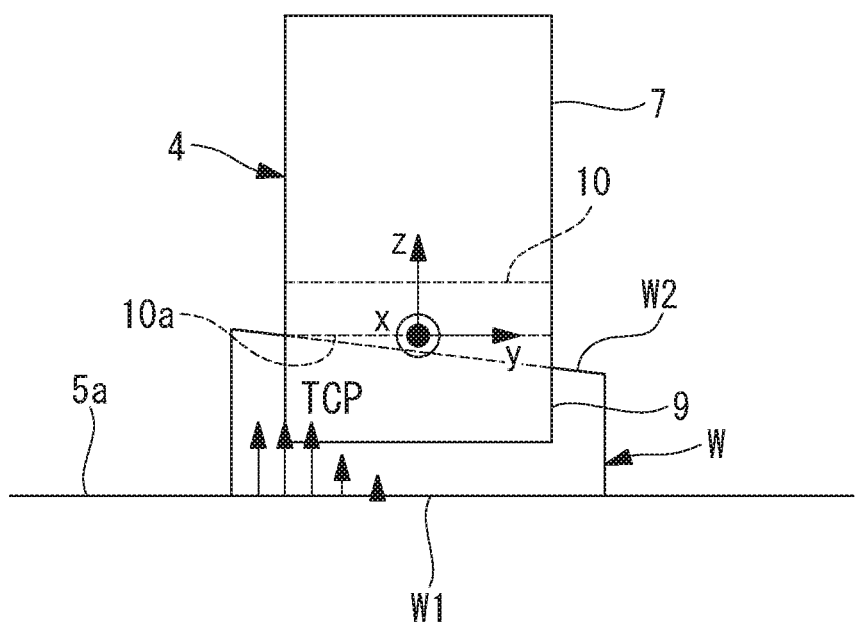
FIG. 8 is a schematic diagram illustrating a pressure distribution generated in a to-be-polished surface when a pressing surface is pressed against an upper surface of the workpiece as the workpiece illustrated in FIG. 4 is grasped.

However, when the shape precision of the workpiece W is low, for example, when the upper surface W2 of the workpiece W is sloped in the y axis direction as illustrated in FIG. 4, and during the initial state in which the pressing surfaces 10*a* contact the upper surface W2 of the workpiece W, the pressing surfaces 10*a* make partial contact and a moment is generated about the x axis direction, as illustrated in FIG. 8. In this case, the controller C controls the robot 2 to change the orientation of the robot 2 in a direction in which the moment decreases.

Figure 9:
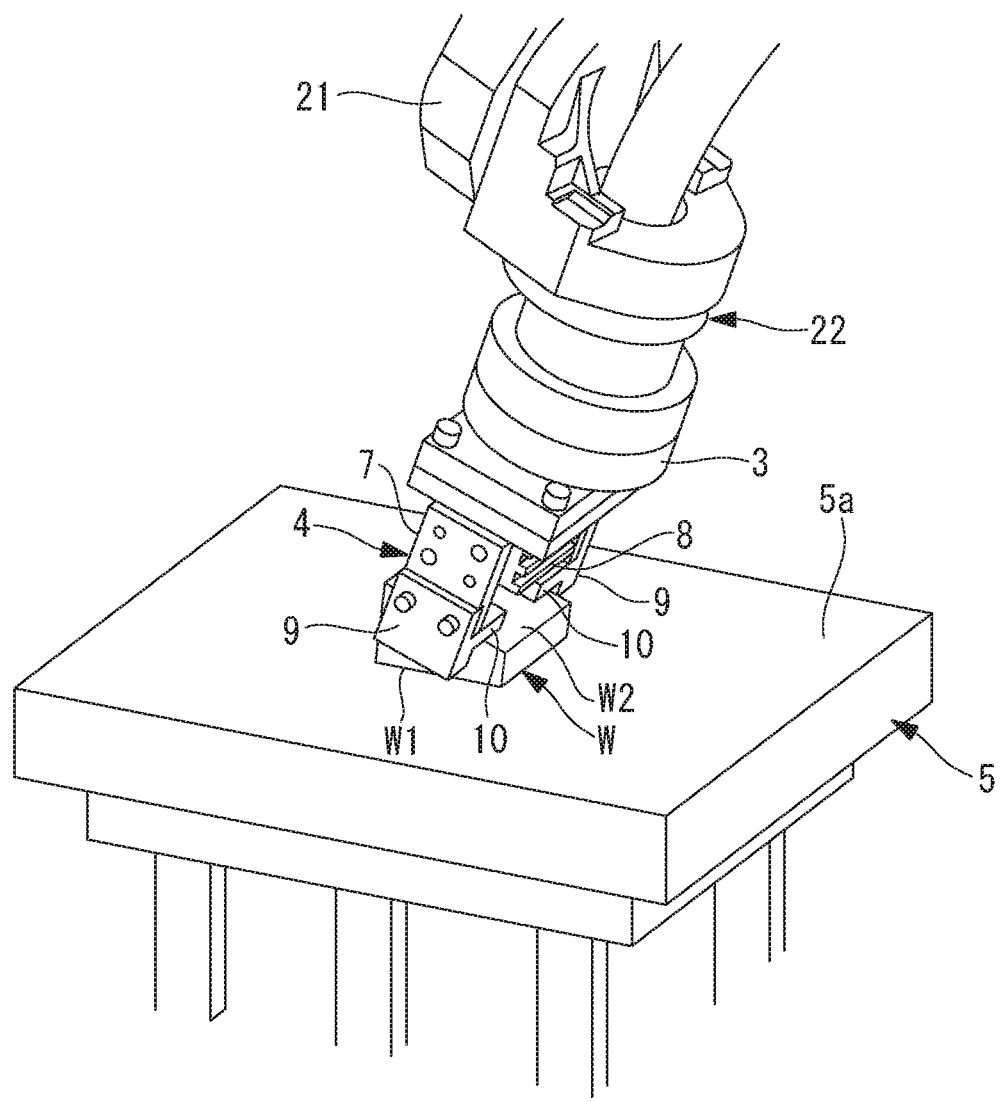
FIG. 9 is a partial perspective view illustrating a state in which the orientation of the robot is changed from the state illustrated in FIG. 8 so that the moments are balanced.
Figure 10:
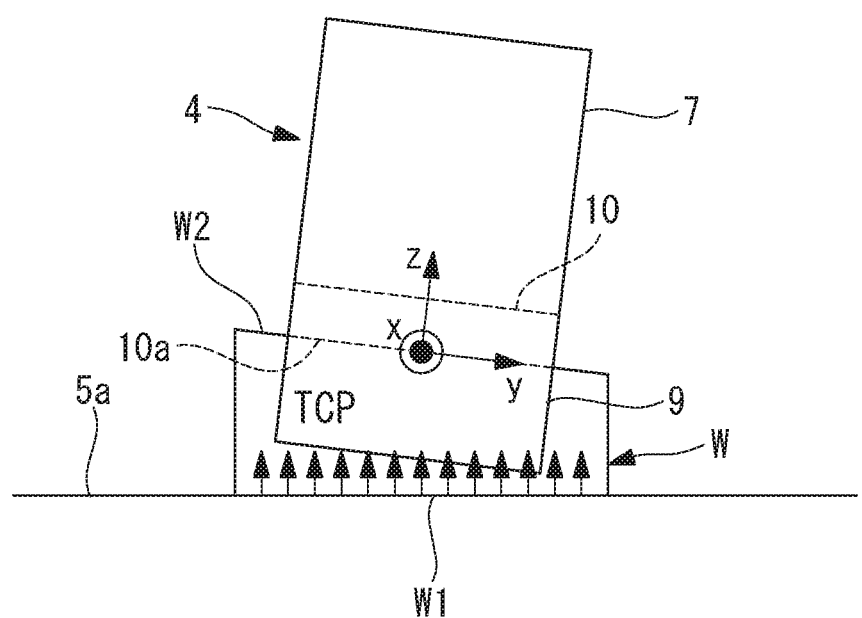
FIG. 10 is a schematic diagram illustrating the pressure distribution generated in the to-be-polished surface in the state illustrated in FIG. 9.

In other words, as illustrated in FIGS. 9 and 10, the controller C operates the robot 2 until the robot 2 assumes an orientation with which all parts of the pressing surface 10*a* contact the upper surface W2 of the workpiece W and the moment about the x axis is balanced by the reaction force from the workpiece W.

Figure 11:
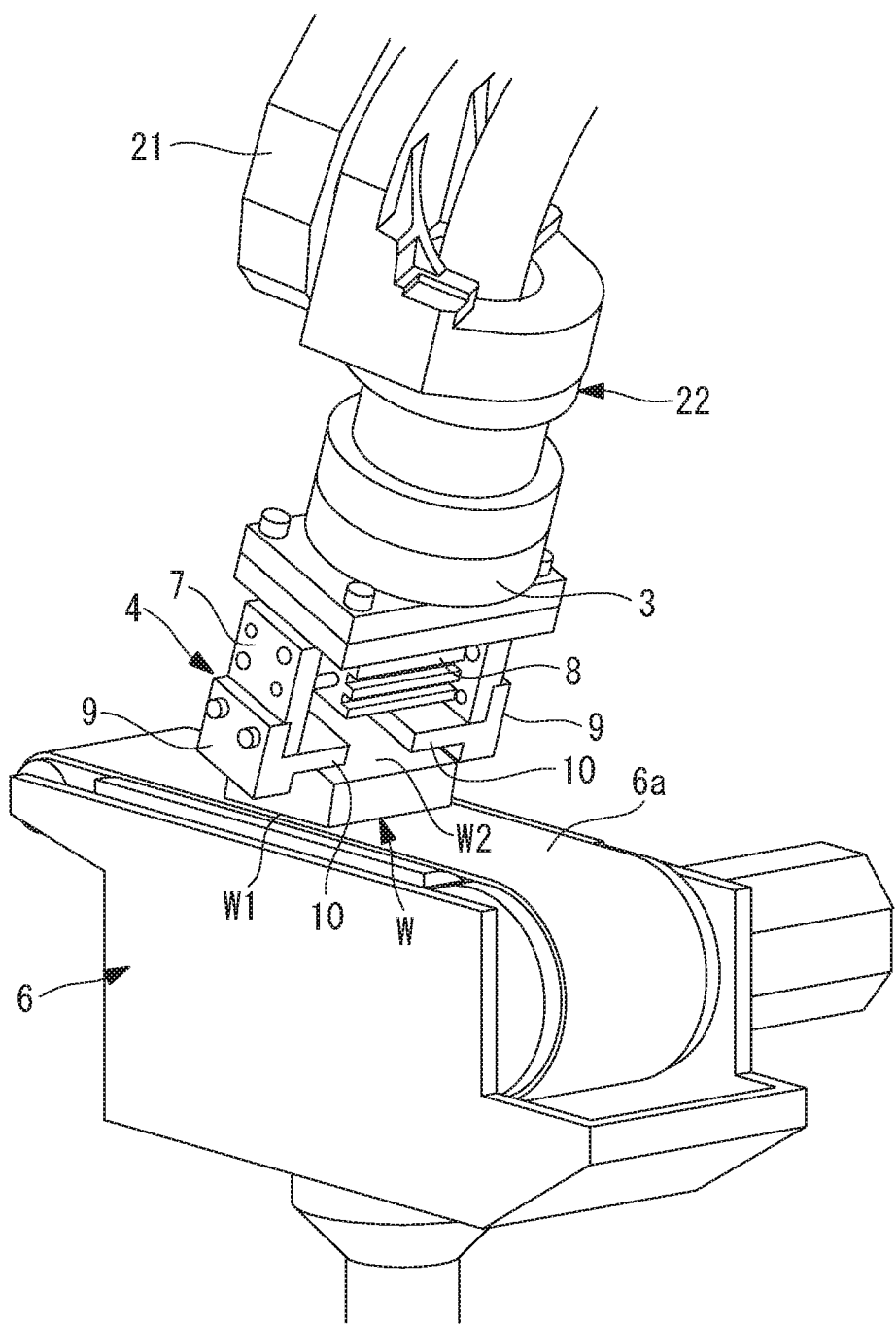
FIG. 11 is a partial perspective view illustrating a polishing process in which the workpiece is moved to a belt sander while maintaining the orientation of the hand illustrated in FIG. 9.

From this state, the controller C operates the hand 4 to grasp the workpiece W between the grasping pieces 9 (step S4). Then, as illustrated in FIG. 11, the controller C operates the robot 2 up to a position where the to-be-polished surface W1 of the workpiece W aligns with the polishing surface 6*a* of the belt sander 6 (step S5). The travel path and the orientation of the robot 2 in the travel path may be any; however, when the table surface 5*a* of the table 5 and the polishing surface 6*a* of the belt sander 6 are parallel to each other, the robot 2 is preferably translationally moved while maintaining the orientation of the hand 4.

Then, from this state, the workpiece W is brought downward in a direction orthogonal to the polishing surface 6*a* so that the to-be-polished surface W1 of the workpiece W can be pressed against the polishing surface 6*a* of the belt sander 6 at an even pressure distribution, and polishing can be performed evenly, which is an advantage.

According to the production method and the production system 1 that use the robot 2 of this embodiment having the aforementioned structure, the orientation of the robot 2 is adjusted not on the basis of the moments detected during the polishing process that involves the belt sander 6, but the robot 2 is operated to assume an orientation with which the moments are balanced when the hand 4 grasps the workpiece W. Thus, partial contact between the to-be-polished surface W1 and the polishing surface 6*a* can be avoided from the beginning of the polishing process, and thus polishing can be performed evenly, which is an advantage.

In other words, even when the workpiece W has low shape precision and the hand 4 has low grasping power, the to-be-polished surface W1 of the workpiece W can be pressed against the polishing surface 6*a* of the polisher 6 at an even pressure distribution, and polishing can be performed with high precision, which is an advantage.

In this embodiment, an example in which the table surface 5*a* of the table 5 and the polishing surface 6*a* of the belt sander 6 are parallel to each other is described; however, when these surfaces are not parallel, a temporary placement table having an upper surface (alignment flat surface) parallel to the polishing surface 6*a* may be disposed near the belt sander 6, and after the workpiece W is pressed against the temporary placement table to make the to-be-polished surface W1 and the polishing surface 6*a* parallel to each other, the workpiece W may be translationally moved up to the belt sander 6.

In this embodiment, an example in which the subject flat surface of the workpiece W to be polished with the belt sander 6 is the to-be-polished surface W1 is described; alternatively, the present invention may be applied to a production method and a production system 1 with which bonding is performed by pressing at an even pressure distribution, such as the case where the subject flat surface (bonding surface) of the workpiece W is bonded to a surface (surface to be bonded) of another member. Alternatively, the present invention may be applied to any other production method and production system 1 in which the subject flat surface of the workpiece W is pressed against a target flat surface at an even pressure distribution.

Alternatively, the robot 2 may be of any type other than the vertical articulated type.

As a result, the above-described embodiment leads to the following aspects.

One aspect of the present invention is directed to a production method that includes: grasping a workpiece with a hand attached to an end of a robot equipped with a force sensor; and pressing a subject flat surface of the grasped workpiece against a target flat surface at an even pressure distribution. The hand includes two grasping pieces that grasp the workpiece by sandwiching the workpiece in a width direction between two surfaces orthogonal to the subject flat surface, and pressing surfaces that abut against a to-be-pressed surface of the workpiece opposite to the subject flat surface. When grasping the workpiece with the hand, the pressing surfaces are caused to abut against the to-be-pressed surface at a vicinity of a grasping position, the robot is operated on a basis of forces detected by the force sensor so that the robot assumes an orientation with which moments about axes that lie within the subject flat surface are balanced, and the workpiece is grasped with the two grasping pieces of the hand at a position where the moments are balanced. Then the robot is operated to assume an orientation with which the subject flat surface aligns with the target flat surface.

According to this aspect, when the workpiece is grasped with the hand attached to the end of the robot, the pressing surfaces of the hand are caused to abut against the to-be-pressed surface of the workpiece, and, thus, force acts from the workpiece to the hand and is detected by the force sensor installed in the robot. Then, on the basis of the detected force, the moments around the axes that lie within the subject flat surface of the workpiece are calculated, and the robot is operated to assume an orientation with which the moments are balanced. In this state, the workpiece is grasped with two grasping pieces in the width direction, and the robot is operated to assume an orientation with which the subject flat surface aligns with the target flat surface. As a result, the operation of pressing the subject flat surface of the workpiece against the target flat surface at an even pressure distribution can be performed.

In other words, the orientation of the hand is adjusted to fit the shape of the workpiece during the process of grasping the workpiece with the hand. Thus, even when a workpiece with low shape precision is to be grasped with a hand with low grasping power, the operation of pressing the subject flat surface of the workpiece against the target flat surface at an even pressure distribution can be performed.

In the aspect described above, before the robot is operated to assume the orientation with which the subject flat surface aligns with the target flat surface, the robot may be operated to assume an orientation with which the subject flat surface aligns with an alignment flat surface parallel to the target flat surface, and, subsequently, the robot may be operated to move from the alignment flat surface to the target flat surface while maintaining the orientation of the workpiece.

According to this feature, when the flat surface on which the workpiece is placed and the target flat surface are not parallel to each other at the time the workpiece is grasped, the alignment flat surface parallel to the target flat surface is used to determine the orientation of the hand and then the robot is operated to move from the alignment flat surface to the target flat surface while maintaining the orientation of the workpiece. By this simple operation, the operation of pressing the subject flat surface of the workpiece against the target flat surface at an even pressure distribution can be easily performed.

In the aspect described above, the target flat surface may be a polishing surface of a polisher that performs polishing, and the subject flat surface may be a to-be-polished surface.

According to this feature, even when the shape precision of the workpiece is low and the grasping power of the hand is low, the to-be-polished surface of the workpiece can be pressed against the polishing surface of the polisher at an even pressure distribution, and polishing can be performed with high precision.

In the aspect described above, the target flat surface may be a surface onto which the workpiece is to be bonded, and the subject flat surface may be a bonding surface.

According to this feature, even when the shape precision of the workpiece is low and the grasping power of the hand is low, the bonding surface of the workpiece can be pressed against the surface to be bonded at an even pressure distribution, and the bonding process can be performed with high precision.

Another aspect of the present invention is directed to a production system that includes a robot equipped with a force sensor; a hand that grasps a workpiece, the hand being attached to an end of the robot; and a controller that controls the robot. The hand includes two grasping pieces that grasp the workpiece by sandwiching the workpiece in a width direction between two surfaces orthogonal to a subject flat surface of the workpiece, and pressing surfaces that abut against a to-be-pressed surface of the workpiece opposite to the subject flat surface. When grasping the workpiece with the hand, the controller controls the robot so that the pressing surfaces are caused to abut against the to-be-pressed surface at a vicinity of a grasping position, the robot is operated on a basis of forces detected by the force sensor so that the robot assumes an orientation with which moments about axes that lie within the subject flat surface are balanced, and the workpiece is grasped with the two grasping pieces of the hand at a position where the moments are balanced; and then the controller controls the robot so that the robot assumes an orientation with which the subject flat surface aligns with the target flat surface.

The invention claimed is:

1. A production method comprising:
grasping a workpiece with a hand attached to an end of a robot equipped with a force sensor; and
pressing a subject flat surface of the grasped workpiece against a target flat surface at an even pressure distribution,
wherein:
the hand includes two grasping pieces that grasp the workpiece by sandwiching the workpiece in a width direction between two surfaces orthogonal to the subject flat surface, and pressing surfaces that abut against a to-be-pressed surface of the workpiece opposite to the subject flat surface;
when grasping the workpiece with the hand,
abutting the pressing surfaces against the to-be-pressed surface at a vicinity of a grasping position,
operating the robot on a basis of forces detected by the force sensor so that the robot assumes an orientation with which moments about axes that lie within the pressing surfaces are balanced, and
grasping the workpiece with the two grasping pieces of the hand at a position where the moments are balanced; and
operating the robot to assume an orientation with which the subject flat surface aligns with the target flat surface.

2. The production method according to claim 1, wherein, before operating the robot to assume the orientation with which the subject flat surface aligns with the target flat surface,
   operating the robot to assume an orientation with which the subject flat surface aligns with an alignment flat surface parallel to the target flat surface, and
   subsequently, operating the robot to move from the alignment flat surface to the target flat surface while maintaining the orientation of the workpiece.

3. The production method according to claim 1, wherein the target flat surface is a polishing surface of a polisher that performs polishing, and
   the subject flat surface is a to-be-polished surface.

4. The production method according to claim 1, wherein the target flat surface is a surface onto which the workpiece is to be bonded, and
   the subject flat surface is a bonding surface.

5. A production system comprising:
   a robot equipped with a force sensor;
   a hand that grasps a workpiece, the hand being attached to an end of the robot; and
   a controller that is configured to control the robot, wherein:
   the hand includes two grasping pieces that grasp the workpiece by sandwiching the workpiece in a width direction between two surfaces orthogonal to a subject flat surface of the workpiece, and pressing surfaces that abut against a to-be-pressed surface of the workpiece opposite to the subject flat surface, and
   when grasping the workpiece with the hand, the controller is configured to control the robot so that the pressing surfaces are caused to abut against the to-be-pressed surface at a vicinity of a grasping position, the robot is operated on a basis of forces detected by the force sensor so that the robot assumes an orientation with which moments about axes that lie within the subject flat surface pressing surfaces are balanced, and the workpiece is grasped with the two grasping pieces of the hand at a position where the moments are balanced; and then the controller is configured to control the robot so that the robot assumes an orientation with which the subject flat surface aligns with the target flat surface.

* * * * *